April 14, 1970     L. W. LOCKWOOD     3,505,690
RECYCLING SEWAGE DISPOSAL SYSTEM
Filed Aug. 7, 1967
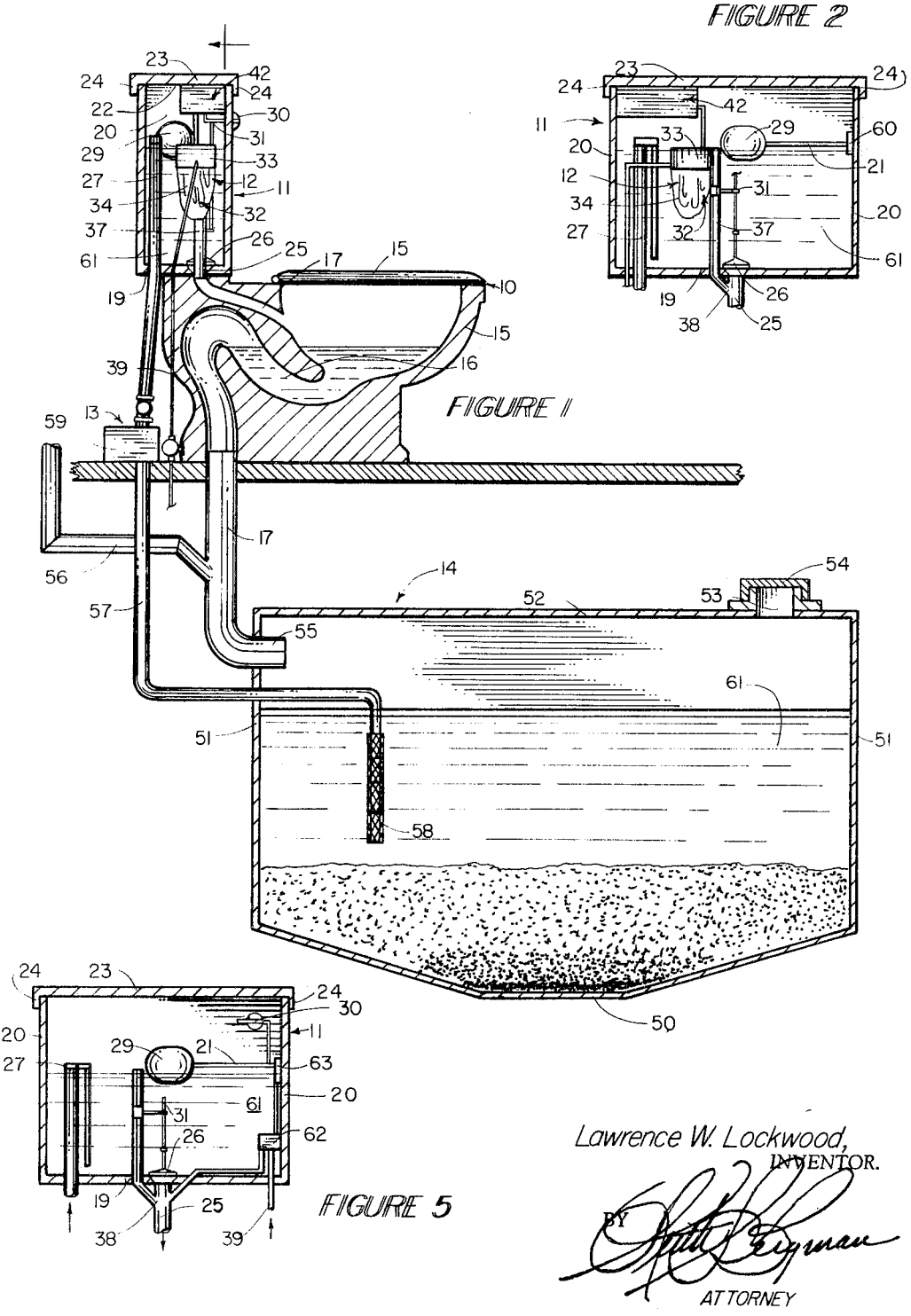
Lawrence W. Lockwood,
INVENTOR.
ATTORNEY April 14, 1970     L. W. LOCKWOOD     3,505,690
RECYCLING SEWAGE DISPOSAL SYSTEM
Filed Aug. 7, 1967
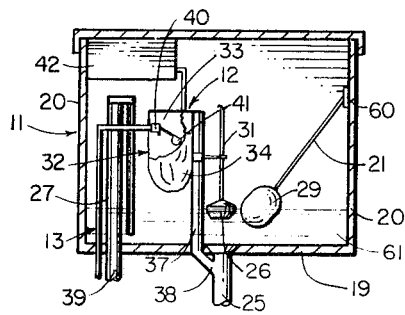
FIG 4A
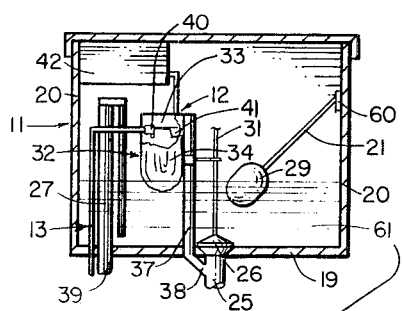
FIG 4B
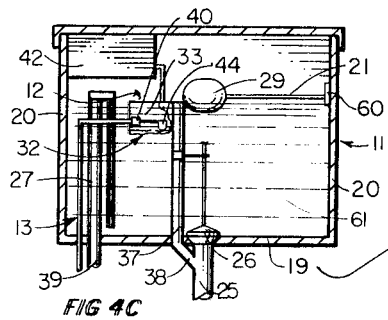
FIG 4C
FIGURE 4
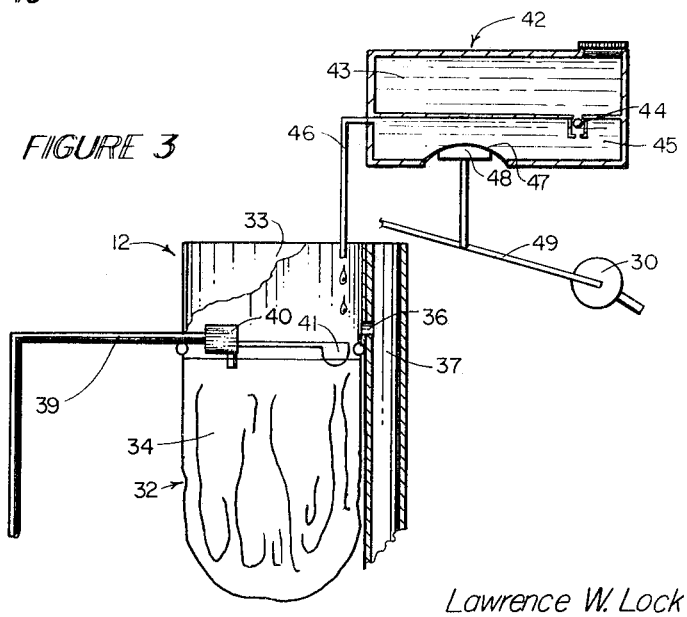
FIGURE 3
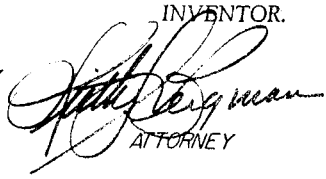
Lawrence W. Lockwood,
INVENTOR.

United States Patent Office 3,505,690
Patented Apr. 14, 1970

3,505,690
RECYCLING SEWAGE DISPOSAL SYSTEM
Lawrence W. Lockwood, 821 E. Crown Ave.,
Spokane, Wash. 99207
Filed Aug. 7, 1967, Ser. No. 658,930
Int. Cl. A47k *11/02;* A61l *11/00*
U.S. Cl. 4—115                                                    7 Claims

ABSTRACT OF THE DISCLOSURE

A sewage disposal system having means for separating and recycling the liquid portion of contained waste to aid in flushing operations. The system is adapted to operate with a normal toilet of commerce with or without an earth drain. A fresh system with auxiliary disinfecting means is embodied to provide a substantially uncontaminated water seal in the toilet bowl trap by use of less fresh water than in an ordinary toilet.

BACKGROUND OF INVENTION

Related applications

There are no applications related hereto filed in this or any foreign countries.

FIELD OF INVENTION

This invention relates generally to a waste disposal system that contains and separates liquid and solid portions of the waste and recycles the liquid portion for flushing operations, and more particularly to such a system that provides a fresh water seal, preferably disinfected, in the toilet bowl drain trap.

DESCRIPTION OF PRIOR ART

With the increase of population in areas that are not serviced by central sewage disposal facilities, particularly as in resort areas, where there is an ever present danger of pollution if the waste be distributed to the earth as in normal sewage disposal systems, the self-contained sewage disposal system having no earth associated drain has become popular and various embodiments of this system have become known. Systems of this type may be grouped generally into a first class containing those providing a self-contained means of waste modification or dispersal, usually with exhaustion to the atmosphere, such as by burning, evaporation, disinfection or the like, and a second class of those providing containment for sewage, without substantial modification, for a period of time with provision for subsequent removal of at least a portion thereof at periodic intervals for disposition at a distance.

It is with the latter class of system that the instant invention is concerned. Since it generally is necessary to maintain water in this type of waste disposal system to aid in moving the solid waste through it and seal the communication between the various elements, a problem arises as to physical volumes of liquid involved, if additional water be continually added to the sewage system for this purpose. To solve this problem one group of systems has provided some means of evaporating the excess water and exhausting it into the atmosphere, but these devices also exhaust deleterious gases and oftentimes are not too sanitary. Another group of such systems has solved the problem by separating the liquid and solid fractions contained in the system, generally in an associated storage tank, and recirculating the liquid portion of the waste through the system for flushing so that new liquid will not need to be continuously added to the system. My invention deals with an improvement in systems of the latter type.

My invention is distinguished from known devices of the latter type in that a unique fresh water system is embodied to provide a substantially fresh water seal in the trap of the toilet bowl drain, requiring addition of only a small amount of fresh water while using the contaminated recirculated water from the separated sewage to remain in the closed flush tank to aid in the flushing operation. An auxiliary disinfectant system may provide disinfectant in the fresh sealing water present in the bowl during non-use periods.

SUMMARY OF INVENTION

The instant invention provides a sewage disposal system communicating with an ordinary toilet of commerce. The toilet communicates by its drain to a storage tank where sewage carried through the system may be contained and separated into liquid and solid fractions by gravity, aided by chemical action if desired. A recirculating circuit communicates from the water porton of this storage tank through a pump and float valve to the flush tank of the toilet to maintain this recirculated water in the tank in the normal fashion.

A separate fresh water supply system is provided in the flush tank. This system includes a fresh water supply regulated by a float valve to fill a fresh water container embodying a rigid top support and flexible lower element with a drain communicating from the upper portion thereof to the toilet bowl, all configured in such fashion that the lower flexible element will fill with fresh water when the tank be flushed. This water will be forced by the water in the flush tank, upon its filling, outwardly through the upper drain and into the toilet bowl to provide fresh water in the toilet bowl for a seal during inoperative periods.

An associated disinfectant dispersing system communicates with the flush handle to periodically disperse measured amounts of disinfectant into the fresh water system so that any contaminated water mixed therewith in the toilet bowl will be substantially disinfected.

Means are provided in the storage tank for removing at least the solid portion of waste carried therein at periodic intervals when necessary. If a disinfecting system be used with my invention it will, in general, stop the bacterial action of a septic tank and thusly require a more frequent pumping; still such a system in normal family use of a resort nature, will not have to be cleaned more than twice during a yearly period.

The amount of new water introduced into the sewage system by my invention is approximately one-eighth that used in the normal flushing operation of a present day toilet of commerce. This low volume is introduced liquid materially aids operation of the system in areas of poor water supply and also aids in waste disposal, whether the waste be physically removed by pumping or exhausted to are earth as in a normal drain field. If the system be used with an earth exhaustion, the required drain field will also be cut down in size to approximately one-eighth that required of a ordinary present day system.

The purposes and objects of such a structure are:

To provide an improved recycling sewage system, for use with a toilet of normal commerce, that recycles liquid waste to aid in the flushing operation.

To provide such a waste disposal system that has an associated fresh water system providing fresh water for the seal in the drainpipe of the toilet bowl, to prevent odors therefrom during period of non-use and yet allow a normal flushing with recirculated liquid waste.

To provide such a system that has an auxiliary disinfectant system adapted to disperse predetermined quantities of disinfectant into the fresh water system to disinfect any contaminant that may be contained therein.

To provide such a system that is of new and novel design, of sturdy and durable nature, of simple and economic manufacture, and one that is otherwise well adapted to the uses and purposes for which it is intended.

Other and further objects of my invention will appear from the following specifications and accompanying drawings which form a part of this application. In carrying out the objects of my invention, however, it is to be understood that its essential features are susceptible of change in design and structural arrangement, with only one preferred and practical embodiment being illustrated in the accompanying drawings, as is required.

BRIEF DESCRIPTION OF DRAWINGS

In the accompanying drawings wherein like numbers of reference refer to similar parts throughout:

FIGURE 1 is a somewhat idealized orthographic cross-sectional view of the closed system of float controlled specie of my invention including, toilet stool, storage tank, and piping communicating therebetween.

FIGURE 2 is a vertical, orthographic, cross-sectional view of the tank of the device of FIGURE 1, showing in somewhat more detail from this aspect the various operative mechanisms, their configuration and relationship.

FIGURE 3 is an enlarged detailed view of part of the float controlled specie of fresh water system included in the flush tank of the toilet.

FIGURE 4 is a semi-diagrammatic series of illustrations showing the operation of the float controlled specie of fresh water system, illustrated in FIGURE 3.

FIGURE 5 is a somewhat idealized sectional view of a solenoid valve controlled specie of fresh water system.

DESCRIPTION OF THE PREFERRED EMBODIMENT

Referring now to the drawings in greater detail and particularly to that of FIGURE 1, it will there be seen that my invention includes, generally, toilet or stool 10 of ordinary design supporting flush or toilet tank 11 carrying fresh water system 12 and communicating by recirculating or recycling system 13 with sewerage holding or storage tank 14, adapted to receive the gravity flow from the stool 10.

Toilet stool 10 is of the ordinary commercial design of commerce, embodying bowl portion 15 communicating by trap 16 with drain 17 adapted to move a gravity flow of sewage from the bowl to storage tank 14. A suitable seat of the ordinary commercial design is provided for normal use with the bowl. The entire structure may be mounted in conventional fashion in a dwelling and, although a floor type model is illustrated, the invention will obviously function as well with wall mounted toilets or other styles providing the same type drain.

Tank 11 is of the ordinary tank structure of commerce with bottom 19 supported by the back of stool 10 and with similar paired opposed ends 20 and sides forming a casement having top opening 22 covered by the removeable top 23, maintained in appropriate position by depending lips 24 aided by gravity.

Flushing drain or flush outlet 25 communicates with the upper portion of bowl 15 of the stool and flow through it is controlled by vertically moveable ball-valve 26. Flow of water through input pipe 27 is controlled by switch 60 operated by ball-float 29 and controlling pump 59. The normal flush handle 30 communicates through appropriate mechanical linkage 31 to the vertical stem of ball-valve 26 to accomplish the flushing operation by raising the ball; the ball is adapted to return thereafter to its normal position by water action aided by gravity. This structure is common in the ordinary flush toilet of present day commerce.

The fresh water system 12 of the float controlled specie of my invention is contained within the chamber of tank 11, as illustrated particularly in FIGURE 2. It includes fresh water chamber or bag 32 having rigid top portion or member 33 releasably communicating with a flexible lower bag 34. This bag is preferably releasably fastened so that it may be replaced if desired or necessitated by usage. The uppermost portion of member 33 is positioned somewhat above the normal water level of the watercloset and bag 34 is preferably configured so that when it is in its downwardmost extended position it will not communicate with bottom 19 of the toilet tank. The water chamber is held in this position by brackets communicating between the rigid upper portion and the inner surface of tank 11.

Referring now particularly to FIGURE 3, the detail of the float-controlled fresh water system may be seen. Outlet drain or exit orifice 36 is provided through rigid top member 33 at a level immediately below the normal water level in the flush tank as determined by switch 60. This outlet drain 36 communicates by outlet pipe 37 to flush outlet 25 at Y joint 38 immediately below flush-valve 26, so that fresh water may pass from the fresh water bag 32 into the toilet bowl while flush-valve 26 is in closed position.

Fresh water is presented to fresh water bag 32 through input pipe or fresh water supply 39 communicating with an external pressurized supply of fresh water (not shown). The level of fresh water in the fresh water system 12 is adjusted by float-valve 40 and associated float 41 to a level immediately below the horizontal level of outlet drain 36.

This entire structure may readily be placed in the normal water storage area of the ordinary flush tank 11 of commerce in the fashion in which it presently exists without any alteration of the tank except to accommodate support structures.

Associated with the fresh water system of my invention is a disinfectant dispersing system 42. This includes the two compartment storage tank having upper storage area or supply chamber 43 supplying liquid through ball-valve 44 to lower dispersing chamber 45. The lower dispersing chamber has outlet channel or dispersal pipe 46 in its uppermost portion communicating with the fresh water bag 32. A portion of lower dispersing chamber 45 has flexible diaphram 47 communicating with plunger 48 through mechanical linkage to flush arm 49 so that when the toilet be flushed, plunger 48 will depress diaphram 47 into chamber 45 to cause a displacement of liquid therein through outlet channel 46. The disinfectant may not flow back to supply chamber 43 because of ball-valve 44. This is only one of many systems that might disperse measured quantities of a liquid disinfectant into the fresh water channel in response to motion of the flushing mechanism.

Sewage storage tank 14 of my invention includes sloping bottom element 50 structurally communicating with side members 51 and top 52 to form a closed structure that may be positioned in the earth ground or elsewhere relative to a structure so long as the positioning be such that gravity will allow the flow of sewage from toilet 10 thereto. An orifice 53 is provided for removal of sewage from tank 14 and an appropriate tight fitting cap 54 is provided to close this opening to prevent escape of deleterious matter therethrough. Drain 17 communicates to the upper portion of this tank through elbow 55 and vent 56 is provided to maintain atmospheric pressure in the system and allow the proper flow of sewage therethrough by gravity. Preferably bottom 50 of the storage tank is sloped, as illustrated, to allow and aid in accumulation of solids in a reasonably coherent mass so that they might be more easily removed when desired.

Recycling system 13 of my invention includes fluid exit pipe 57 having a vertically disposed screened entrance portion 58 adapted to filter solids and accept liquids from waste matter contained in storage tank 14. The element 58 need have some vertical length as the level of liquids in the storage tank will vary considerably during the course of operation. Pipe 57 communicates through pump 59 to the interior chamber of toilet tank 11, preferably in its upper portion to allow filling of the tank to the level determined by float switch 60. This switch 60 controls energy imput to pump 59, preferably electric, so that when the appropriate water level is reached in the flush tank the pump will cease activity and flow of water will stop. Pump 59 may be physically located within the interior chamber of toilet tank 11 if desired, but it generally is more feasible to locate it externally thereto because of structural requirements. With this structure, then, water carried in storage tank 14 may be pumped into the flush chamber of toilet tank 11 to be recirculated to aid in carrying further sewage into the storage tank 14.

A second specie of fresh water system for my invention is illustrated in FIGURE 5. Here the fresh water supply 39 communicates through solenoid valve 62 directly to Y 38. The solenoid valve is activated by delay switch 63 physically associated with flush handle 30. With this specie of fresh water system, when the flush handle is activated the delay switch will activate and it is timed to delay opening of the solenoid valve until the flush tank is emptied and then open the valve for a short period to allow passage of sufficient fresh water to seal the toilet bowl drain. This specie of fresh water system is simpler than the float controlled specie, but less dependable if there be any substantial variance in pressure of the fresh water supply.

Having thusly described the structure of my invention, its operation may now be understood, with reference particularly to the diagrams of FIGURE 4.

Since the flushing operation is a circularly cyclic process, it will be described assuming a filled tank. In this condition if flush handle 30 be activated, flush-valve 26 will be raised and the water 61 in flush tank 11 allowed to drain by gravity through flush outlet 25 into toilet bowl 15. When this happens the toilet bowl will drain its contents by gravity through drain 17 into storage tank 14. This operation, while the tank is still flushing, is illustrated in Diagram 4A of FIGURE 4.

In the previous filled condition, fresh water system 12 will have drained and as water 61 in the flush tank is voided from the tank, the fresh water float-valve 40 will activate to allow fresh water to run into fresh water chamber 32 until the float level is reached. This bag will have been substantially filled by the time the flush tank is emptied into the toilet bowl.

In this condition then, flush-valve 26 will move automatically by gravity and water action to again close flush outlet 25 as soon as the water thereabout is exhausted. Switch 60 will have activated at least by this time and liquid from storage tank 14 will be pumped into the chamber of toilet tank 11 to refill it. This condition of the device is shown in Diagram 4B of FIGURE 4, where the flush tank is filling and the fresh water bag is already filled.

As the level of water in toilet tank 11 moves upwardly and reaches a level that is horizontally equal to that of fresh water outlet drain 36, a pressure will be created upon the flexible fresh water bag 32 and the fresh water held therein will almost immediately drain through outlet 36 and pipe 37 into bowl 15 of toilet 10. This draining action will cause the fresh water to displace the contaminated water then in the bowl, to a substantial degree. The fresh water previously will have had disinfectant admixed with it by operation of the flushing handle. This disinfectant, especially if of a liquid nature, will disperse almost immediately in the fresh water so that the mixture wil be reasonably homogeneous at the time of release. In this condition then, the water contained in the bowl 15 will be fresh disinfected water and the toilet will remain in this condition until further use recycles the system in the aforesaid fashion.

It is to be noted that when the fresh water system is in this condition, as illustrated in Diagram 4C of FIGURE 4, the fresh water float-valve 40 will be maintained in its upward or closed position by the water 61 in toilet tank 11, but will again reactivate the fresh water system when the tank begins to empty.

By reason of the aforesaid operation, it is seen that the flushing action of the toilet is carried out by a relatively larger volume of contaminated water recycled from the storage tank while the water remaining in the toilet bowl to seal the trap in the outlet pipe thereof is a substantially less volume of fresh water placed in the system by the fresh water system. In general, this amount of fresh water introduced by each use is of approximately one quart in measure, and with a storage tank of four or five hundred gallon capacity, the system would serve the average family for many months without any necessity of pumping.

It is further to be noted that some type of waste removal system that is old in the art could be incorporated with my invention to remove some of the liquids from the storage tank 14, reducing the waste to gases and exhausting them to the atmosphere so that the tank could be used for a much longer period without the necessity of any pumping.

In general to start the operation it would be necessary to introduce a sufficient amount of liquid in the storage tank to allow a proper filling of toilet tank 11. Normally in the operation all of the liquid would never be pumped from the storage tank upon cleaning and usually there would be no need to reintroduce a supply of liquid to make the tank again operative.

It is further to be noted that normal toilet fixtures might be used with my invention and the various items of my invention embodied therein only by addition to the commercial structures.

It is further to be noted that this system may be operated for a substantial period of time with only a very minimal supply of fresh water if there be a shortage of it.

The foregoing description of my invention is necessarily of a detailed nature so that a specific embodiment of it might be set forth as required, but it is to be understood that various modifications of detail, and rearrangement and multiplication of parts may be resorted to without departing from its spirit, essence or scope.

Having thusly described my invention, what I desire to protect by Letters Patent, and

What I claim is:

1. In a sewage disposal system having a toilet serviced by a gravity activated flush tank with a holding tank receiving the gravity flow of sewage therefrom, and having means of recycling the liquid fraction thereof for flushing, a fresh water system including:

means for introducing fresh water into said toilet bowl, after a flushing operation, said water being in sufficient quantity to substantially form a fresh water seal in the drain trap of said toilet bowl.

2. The invention of claim 1 wherein said means for introducing fresh water into said toilet bowl comprise:

a fresh water chamber having a flexible lower portion and a rigid upper portion with an exit orifice therein at a horizontal level below the uppermost water level of said flush tank, said orifice communicating to the bowl of said toilet; and a fresh water system including float means capable of filling said fresh water chamber when said flush tank is empty.

3. The invention of claim 1 wherein said means for introducing fresh water into said toilet bowl comprise:

a fresh water supply communicating through a solenoid valve to the bowl of said toilet; and a time delay switch associated with the toilet flush handle and controlling the solenoid valve aforesaid to allow it to pass sufficient fresh water to seal the toilet bowl drain after flushing is completed.

4. The invention of claim 1 having means for introducing a predetermined amount of chemical into the fresh water system.

5. The invention of claim 1 further characterized by a means for disinfecting said fresh water supply system, including, in combination:

a supply chamber communicating by a one-way valve with— a dispersing chamber having a dispersal pipe communicating to said fresh water chamber and a flexible diaphragm in a part thereof, and a plunger having mechanical linkage communicating with the flush mechanism and capable of indenting said flexible diaphragm to cause dispersal of a predetermined amount of matter from said dispersing chamber.

6. A sewage disposal system of the nature aforesaid, comprising, in combination:

a toilet bowl communicating through a water closed trap to a drainage system communicating for gravity flow to a sewage holding tank therebelow;

a flush tank draining by gravity through a flush valve to said toilet bowl;

a recycling system, including a pipe communicating with the liquid fraction carried in said sewage holding tank through a pump, to said flush tank to maintain a predetermined level of water therein;

a fresh water system within the chamber of said flush tank communicating to said toilet bowl and including a fresh water chamber with flexible lower portion and rigid upper portion with an exit orifice communicating from said upper portion at a level slightly below the uppermost flush tank water level to said toilet bowl;

fresh water supply means including a float-valve adapted to maintain a level of fresh water in said fresh water system immediately below aforesaid exit orifice; and a disinfectant system associated with said fresh water system, adapted to place therein a predetermined mount of disinfectant upon activation of said flushing mechanism.

7. A closed sewage disposal system of the nature aforesaid comprising, in combination:

a toilet bowl communicating through a water closed trap to a drainage system communicating for gravity flow to a sewage holding tank therebelow;

a flush tank draining by gravity through a flush valve to said toilet bowl;

a recycling system, including a pipe communicating with the liquid fraction carried in said sewage holding tank through a pump, to said flush tank to maintain a predetermined level of water therein;

a fresh water system communicating through a solenoid valve to said toilet bowl;

a delay switch communicating with the flush handle of said flush tank and controlling said solenoid valve to allow passage of a predetermined amount of fresh water into said toilet bowl after the flushing thereof to form a seal in the drain thereof;

a disinfectant system associated with said fresh water system, adapted to place therein a predetermined amount of disinfectant upon activation of said flush handle.

References Cited

UNITED STATES PATENTS

| | | | |
|---|---|---|---|
| 243,970 | 7/1881 | Powers | 4—227 |
| 415,869 | 11/1889 | Kelly | 4—18 |
| 694,627 | 3/1902 | Glackin | 137—396 |
| 815,661 | 3/1906 | Vissing | 4—18 |
| 885,828 | 4/1908 | Bartlett | 137—101.25 |
| 1,303,358 | 5/1919 | Montgomery | 4—115 |
| 2,740,971 | 5/1956 | Weekes | 4—115 |
| 3,034,151 | 5/1962 | Filliung | 4—100 X |

FOREIGN PATENTS

| | | |
|---|---|---|
| 255,523 | 11/1964 | Australia. |
| 1,185 | 1/1886 | Great Britain. |
| 10,472 | 8/1891 | Great Britain. |
| 1,017,786 | 1/1966 | Great Britain. |
| 58,284 | 6/1953 | France. |
| 850,598 | 9/1939 | France. |

LAVERNE D. GEIGER, Primary Examiner

D. B. MASSENBERG, Assistant Examiner